Patented May 20, 1941

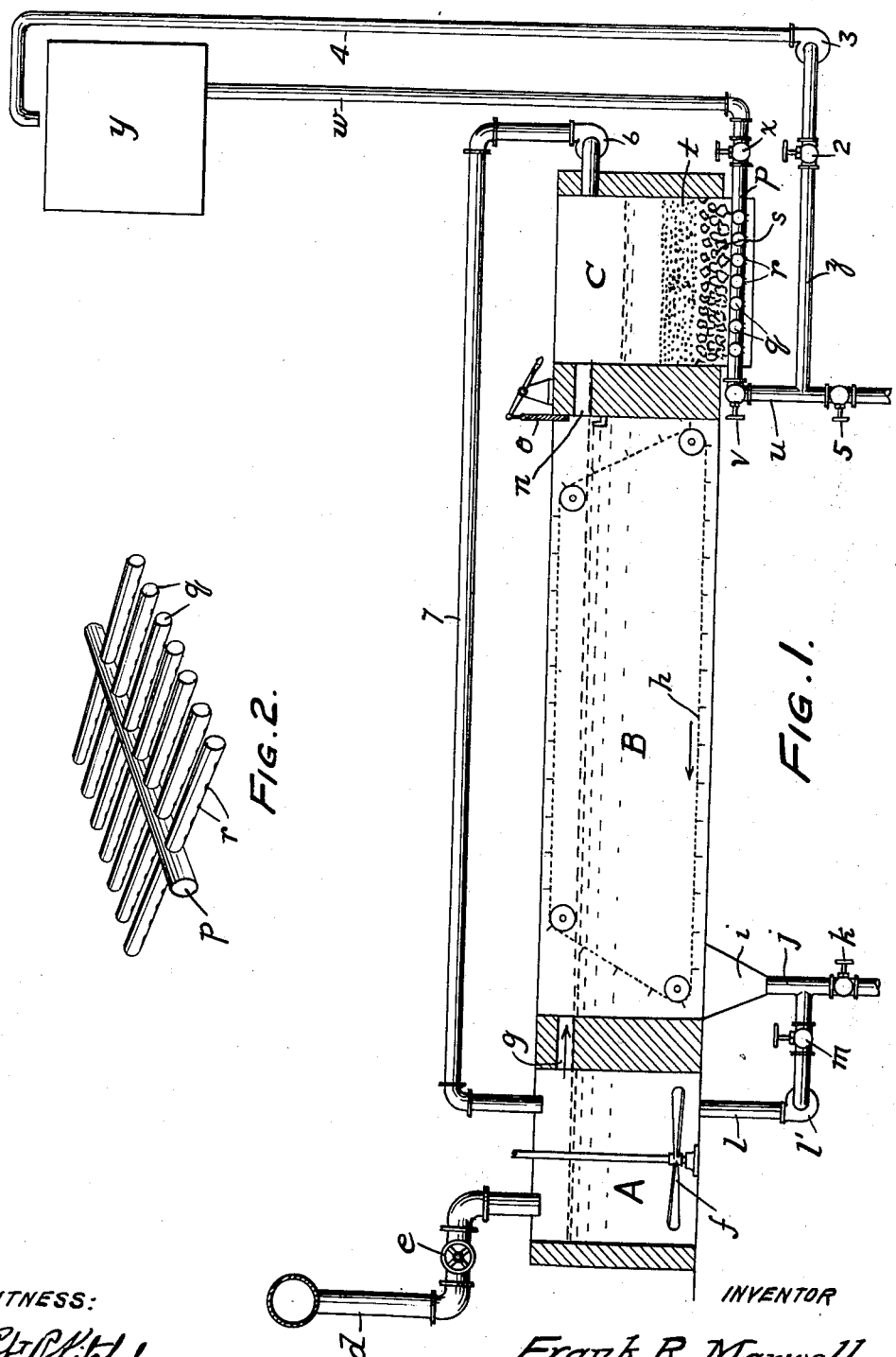

2,242,652

UNITED STATES PATENT OFFICE 2,242,652

METHOD AND APPARATUS FOR TREATING SEWAGE

Frank R. Maxwell, Rose Valley, Pa., assignor to Sun Shipbuilding & Dry Dock Company, Chester, Pa., a corporation of Pennsylvania Application April 6, 1938, Serial No. 200,283

3 Claims. (Cl. 210—5)

This invention relates to a method and apparatus for treating sewage.

More particularly the method and apparatus in accordance with this invention are adapted for the treatment of sewage in a novel manner whereby the solid constituents of the sewage are effectively and, at the same time, economically removed from the liquid and the effluent liquid discharged in a condition of high clarity enabling it to be introduced directly into a stream or river without discoloration thereof and in a condition adapting it for purification by oxidation in the stream or river.

Heretofore it has been known to subject raw sewage to aeration and then to sedimentation, to effect activation of the sludge and separation thereof from the liquid constituent, and in such procedure attempts have been made to filter the sewage after aeration. However, such procedure in general has not resulted in desired clarification of the liquid constituent and where filtering has been attempted, it has proved impractical due to rapid clogging of the filter by solids.

Now in accordance with this invention, generally speaking, raw sewage, having been screened, for example, through a bar screen, is first subjected to agitation for a period to agglomerate the fine and impalpable solids with the larger solids, preferably, however, without effecting aeration to a degree sufficient to activate the sludge or set up a condition favorable to the propagation of aerobic bacteria.

The sewage having been agitated for a sufficient time to agglomerate the fine and impalpable solids with the larger solids, it is permitted to remain quiescent or substantially quiescent for the settling out of the agglomerated solids and the liquid constituent is then passed through a filter bed of sand or the like fine filtering material.

The method in accordance with this invention from the broad standpoint comprises agitation, settlement and filtration through a bed of fine filtering material.

The agitation, more particularly, is of such a character and is continued for such a length of time as to agglomerate the major part, if not practically all, of the finer solid particles in the sewage. The agitation, however, on the other hand, is preferably not of such a character or continued for such a period of time as to promote activation of the sludge or solid matter.

As the result of agitation as specifically described, the settling step results in the substantially complete separation of the solid constituents of the sewage from the liquid constituent. At least the settling step following the agitation step results in the settlement out of all or most of the impalpable solid matter and as a result the liquid constituent may be effectively filtered through a fine filter, such as a bed of fine sand, or the like.

The filtering step results in the removal from the liquid constituents of the finer or impalpable solid matters remaining after the settlement step, with the result that the effluent water flowing away from the filter is of the highest clarity and of a character such that it will readily become purified when introduced into a stream or river and subjected to oxidation therein.

As a result of the particular degree of agitation to which the raw sewage is subjected, coupled with the settling step, the solid matter remaining in the sewage passed through the filter in the filtering step is of such a character and of such fineness that clogging of the filter bed to an extent to interfere with the passage therefrom of the liquid constituent is so long delayed as to render the filter effective for long periods and in consequence operative in the treatment of large quantities of sewage without necessity for cleaning.

More specifically, the method in accordance with this invention involves the removal of sludge from the settling tank and the return of a portion of such sludge, which it should be noted is not activated, to the agitation step. Further, and more specifically, the method comprises the periodic washing back of the filter, utilizing desirably a portion of the effluent water discharged from the filter for such purpose. Again, still more specifically, the method involves the return from the filter of a major portion of the wash back water and solids washed back from the filter bed to the agitation step.

The method in accordance with this invention will now be described in detail in connection with a description of a preferred embodiment of apparatus in accordance with this invention with reference to the accompanying drawing, in connection with which the modus operandi according to the method from the broad standpoint will be clear.

In the accompanying drawing Figure 1 is a longitudinal sectional view of an apparatus in accordance with this invention, for the treatment of sewage in accordance with the method of this invention.

Figure 2 is a perspective view in detail of the apparatus of Figure 1, more particularly in connection with the filtration element of the apparatus.

Referring now to Figure 1, it will be noted that the apparatus as illustrated comprises three major elements. Thus, an agitation chamber A, a settling chamber B, and a filter C.

Raw sewage, having been first screened, as is the custom through, for example, a bar screen to remove solid matters of relatively large size, is introduced into the agitation chamber A through conduit d under the control of valve e. The agitation chamber A is provided with an agitator f adapted to be driven through suitable connection with any suitable source of power and the agitator is so designed as to permit a continuous agitation and circulation of the sewage in chamber A throughout the entire chamber.

The sewage is subjected to agitation in chamber A for such a period of time as is necessary, depending upon the average size characteristics of the solid matter in the sewage, to effect agglomeration of the finer and impalpable particles of the sewage with the larger particles. In other words, for such a time as is necessary to effect agglomeration of the particles of solid matter of the sewage which are of such size and/or low specific gravity as to resist gravital settlement with the larger and heavier particles such as are readily gravitally settled.

In the agitation of the sewage in chamber A by the agitator f, there will be a tendency for the sewage to be aerated to a greater or less degree. In the agitation step it is desirable that the aeration of the sewage to a degree sufficient to activate the solid matter or sludge be avoided and desirably the period of agitation with respect to the degree of agitation will be regulated to the end that activation of the sludge or aeration to an extent such as to promote the growth of aerobic bacteria will be avoided.

Generally speaking, with relatively rapid circulation and agitation of the sewage in chamber A, the sewage will be allowed to remain in chamber A under agitation and circulation for say from 1½ to 2 hours as a fair average for sewage containing solid matter of average size. The period during which the sewage is permitted to remain in chamber A during agitation and circulation is readily determinable.

The sewage having been agitated as described in the chamber A, passes through conduit g into settling tank B. The sewage has a slow flow through the tank B, or, in other words, lays substantially quiescent therein so that settlement of the agglomerated solids is promoted.

By way of illustration, the tank B may be made of such a length with respect to the amount of sewage to be flowed therethrough that the sewage will remain substantially quiescent in the tank for say from 1-2 hours.

The tank B is equipped with any suitable form of scraping device, which may be a continuous chain scraper h, such as illustrated, for the discharge of sludge from the bottom of the tank B into the discharge hopper i. A conduit j, provided with the valve k is connected to the bottom of the discharge hopper i for the discharge of sludge from tank B to such disposal means as a furnace, or otherwise, as may be used for disposing of the sludge.

Connected to the conduit j, adjacent the bottom of the discharge hopper i is conduit l provided with a valve m, leading back to the agitation chamber A. A pump l' is connected with the conduit l, for the return of sludge to the chamber A.

From the settling tank B the liquid constituent of the sewage from which the solid matter has been settled out except for a minor amount of impalpable solids, passes to the filter C, through a conduit n, controlled by a gate valve o. The filter C is provided in its bottom with a manifold p, from which extend lateral collector conduits q, closed at their outer ends and provided with openings r in their lower portions; i. e., opposite the bottom of the filter. The manifold p and the laterals q are positioned slightly above the bottom of the filter C and are overlaid with a layer of coarse material, as rock s, over which lies a filtering bed of fine sand t, or other similar filtering material.

To one end of the manifold p is connected a conduit u provided with a valve v adjacent the end of the manifold. From the conduit u filtered liquid constituent of the sewage is adapted to be discharged to a point of ultimate disposition, as into a river or stream.

To the other end of the manifold is connected a conduit w, controlled by a valve x, positioned adjacent the end of the manifold and leading from a tank y. Beyond the valve v in conduit u a conduit z, controlled by valve 2, leads to pump 3, connected to discharge into tank y from conduit 4. A valve 5 is connected into the conduit u beyond the point of connection of the conduit z with the conduit u. From the upper part of the filter c in line with the conduit n, a conduit 7, in which is connected a pump 6, leads back to the agitation chamber A.

From the above description, it is believed that the actuation of the apparatus in accordance with this invention as described, for the carrying out of the method in accordance with this invention, will be clear. However, it will be appreciated that sewage having been agitated in tank A, passes into the tank B, in which settling out of agglomerated solid matter occurs. The settled solid matter or sludge is removed from the tank B and a portion of it may be and desirably is returned to the agitation chamber A through the conduit l. Sludge from tank B may be readily returned to chamber A by closing, or partly closing, valve k, opening valve n and operating the pump l'.

The liquid constituent of the sewage, from which substantially all of the solid matter has been settled out due to the agglomerating effect obtained in the agitation chamber A, passes through the conduit n into the filter, in which it passes through the bed of sand t, through the bed of rock, which serves to prevent the sand from clogging the openings r in the laterals q, and into the manifold p and is discharged at a point of ultimate disposition through conduit u.

In the ordinary working of the filter the valve x and the conduit w leading to the tank y and the valve 2 and the conduit z leading to the pump 3, are closed, while the valves v and s in the conduit u are open.

Periodically the bed of sand t in the filter will be washed back and such is readily accomplished by closing valve s in conduit u, opening the valve 2 in conduit z and filling the tank y with liquid by operation of pump 3. When the tank y is filled, the valves v and s in conduit u are closed and the valve x in conduit w opened, permitting the contents of tank y to flow into the manifold p and into the filter bed through the openings r in the laterals q. The tank y is placed at such a height and has sufficient capacity to provide a supply of liquid at sufficient pressure to thoroughly stir up and wash back the bed of sand t. In the washing back operation, the gate valve o is closed and the pump 6 operated to return the major portion of the washed back water and solids washed out of the filter bed to the agitation chamber A, through conduit 7.

Thus, in addition to the agitation for agglomeration of solids, settlement and filtration of the liquid constituent of the sewage after settlement out of the solids, the operation of the method in accordance with this invention contemplates from the more specific standpoint variously the periodic washing back of the bed of the filter, the return of washed back solid matter to the agitation chamber and the return to the agitation chamber of a portion of the sludge settled out in the settling chamber. It will be noted, more specifically, that the washing back of the filter bed is accomplished in this connection through the use of effluent water from the sewage.

It will be appreciated that from the apparatus standpoint the various elements described above function for the performance of the several steps in the procedure in accordance with the method. It will be appreciated that the method and apparatus in accordance with this invention may be variously modified in detail from the specific description given above by way of illustration and that it is contemplated that modification in both the apparatus and method may be made within the scope of the invention.

What I claim and desire to protect by Letters Patent is:

1. The method for treating sewage which consists in flowing raw sewage comprising liquid and solid matter continuously through a zone of agitation, agitating the sewage in the zone of agitation, the flow of the sewage through the agitation zone being at a rate such that relatively non-settleable solid matter will be agglomerated with readily settleable solid matter while avoiding aeration of the sewage to an extent to activate the solid matter, flowing the sewage from the zone of agitation through a settling zone at a rate such as to permit settling out of agglomerated solid matter, flowing the supernatant liquid through a bed of fine filtering material, periodically stopping the flow of supernatant liquid through the bed of filtering material and returning therethrough a portion of the filtrate therefrom to wash back the bed of filtering material and returning washed back solid material and returned filtrate to the agitation zone for agitation therein.

2. The method for treating sewage which consists in flowing raw sewage comprising liquid and solid matter continuously through a zone of agitation, agitating the sewage in the zone of agitation, the flow of the sewage through the agitation zone being at a rate such that relatively non-settleable solid matter will be agglomerated with readily settleable solid matter while avoiding aeration of the sewage to an extent to activate the solid matter, flowing the sewage from the zone of agitation through a settling zone at a rate such as to permit settling out of agglomerated solid matter, returning a portion of the settled out solid matter to the zone of agitation, flowing the supernatant liquid through a bed of fine filtering material, periodically stopping the flow of supernatant liquid through the bed of filtering material and returning therethrough a portion of the filtrate therefrom to wash back the bed of filtering material and returning washed back solid material and returned filtrate to the agitation zone for agitation therein.

3. Apparatus for the treatment of sewage comprising a chamber adapted to receive a flow of raw sewage, means for agitating raw sewage in said chamber, a settling tank, means for conducting raw sewage from said chamber to the settling tank, means for removing sludge from the settling tank, a filter including a bed of fine filtering material, means for conducting supernatant liquid from said settling tank to said filter and for conducting filtered liquid away from said filter, means for interrupting the flow of liquid from said settling tank to said filter, a tank elevated above said filter, means for conducting filtered liquid to said tank, means for conducting filtered liquid from said tank back through the filter by gravital flow when the flow of liquid from said settling tank to said filter is interrupted and means for conducting back to said chamber liquid conducted back through said filter and solids washed back thereby.

FRANK R. MAXWELL.